April 8, 1952     W. M. ZAIKOWSKY     2,591,761
APPARATUS FOR GAS ANALYSIS
Filed June 14, 1946     2 SHEETS—SHEET 1
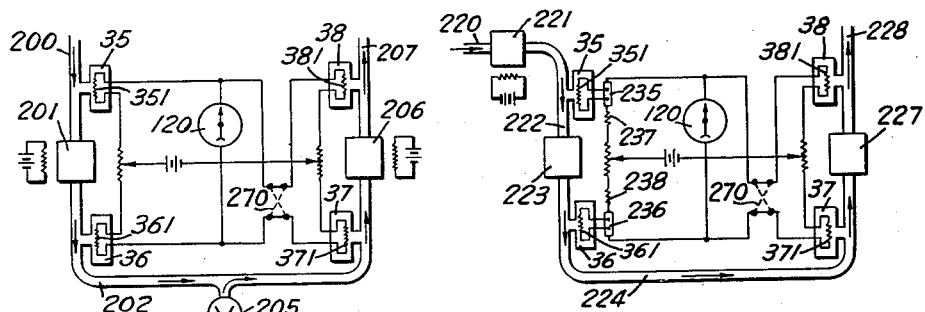
Fig. 2     Fig. 3
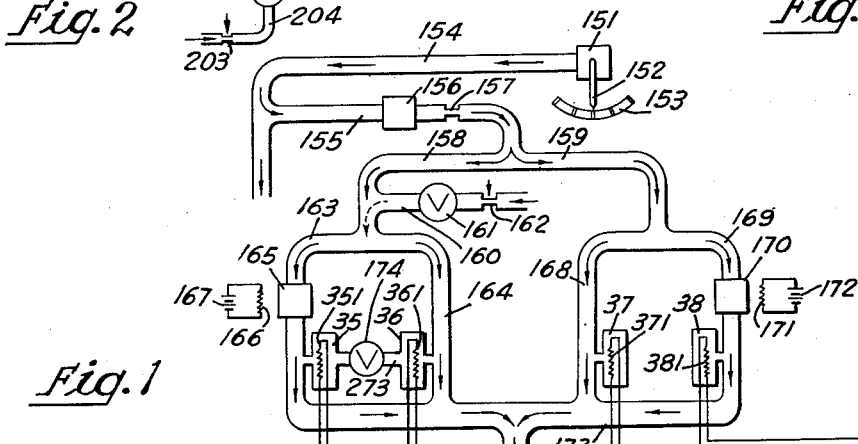
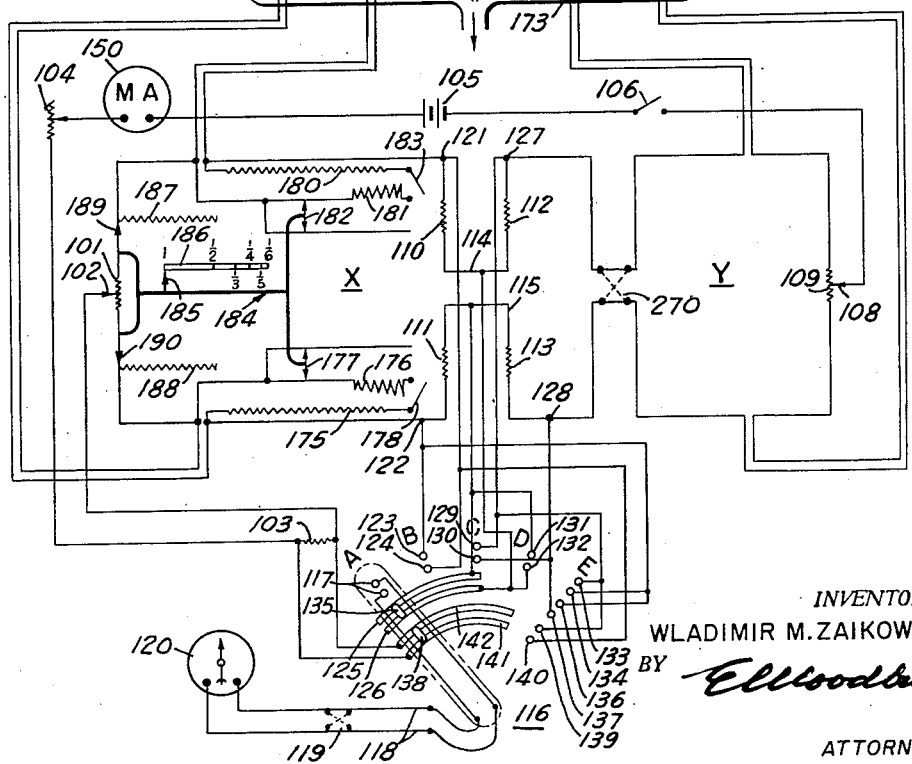
Fig. 1
INVENTOR.
WLADIMIR M. ZAIKOWSKY
BY
ATTORNEY Patented Apr. 8, 1952

2,591,761

UNITED STATES PATENT OFFICE 2,591,761

APPARATUS FOR GAS ANALYSIS

Wladimir M. Zaikowsky, Pasadena, Calif., assignor to Nina D. Zaikowsky

Application June 14, 1946, Serial No. 676,819

8 Claims. (Cl. 73—27)

This invention relates broadly to measuring methods and apparatus which are particularly useful in connection with, although they are not limited to, gas analysis.

A specific application of the invention is to gas analysis in which it is desired to produce a single reading which will continually indicate the concentration of one component as the result of measurement of the concentrations of two or more related components. In that sense the present invention represents a further development of the methods disclosed in my copending application, Serial No. 564,645, filed November 22, 1944 for showing the amount of oxygen necessary for complete combustion of hydrocarbons by the integration into a single reading of the effects produced separately by carbon dioxide and water resulting from combustion.

An object of the invention is to provide improved bridge circuits for facilitating measurements of both the summation effects and the difference effects of two resistances that are subjected to conjugated or mutually dependent variations.

Another object of the invention is to provide bridge circuits that facilitate the comparison of a plurality of pairs of resistances and the comparison of the individual resistances composing said pairs.

Another object is to provide bridge circuits containing a plurality of resistances of different predetermined sensitivities, whereby the bridge circuits are capable of reducing a plurality of conjugated effects to a common scale.

Another object is to reduce to a common scale the cooling effects of gases having different thermal conductivities, whereby said effects can be integrated by means of identical temperature-sensitive resistors in a common bridge circuit.

Still another object is to extend the general methods of analysis disclosed in my aforementioned prior application Serial No. 564,645 to the measurement of parent substances by measurements on gaseous components resulting therefrom, where the gaseous components have thermal conductivities that are not equally proportional to the amounts of the parent substances required for their formation.

Other more specific objects and features of the invention will appear from the description to follow.

The prior application, Serial No. 564,645, discloses a method of measuring the amount of oxygen required for complete combustion of hydrocarbons by integrating the effects of the thermal- conductivities of the water and the carbon dioxide resulting from combustion.

As pointed out in that application, in the case of hydrocarbons, the total effect on the thermal-conductivity of the water produced by the consumption of one mole of oxygen can be assumed to be equal in magnitude, although opposite in sign to the effect on the thermal-conductivity of the carbon dioxide produced from a single mole of oxygen. Thus, for the system disclosed in the prior application, the ratio between the effects produced by the gaseous components resulting from combustion is equal to the ratio between the volumes of oxygen consumed in their formation.

In accordance with the present invention, the bridge circuit described in the prior application, Serial No. 564,645, is adapted to effect similar measurements when the mentioned equality of proportions does not exist. This greatly extends the usefulness of the circuits of said prior application because, generally speaking, two parent substances, gaseous or solid, often result in the formation of a gas having two or more gaseous components that will produce effects on the thermal-conductivity of the gas that are not equally proportional to the amount of the parent substances consumed in their formation; and in certain cases, the product of interaction may contain gases that do not include the parent substance to be measured at all and yet are characteristic of the amount of said parent substance.

In part, the present invention resides in methods and apparatus for varying the relative effects of gases on different temperature-sensitive resistors in a bridge circuit and includes several different ways of obtaining this result.

One way is to provide a bridge circuit in which the sensitivity (to the cooling effect of a gas) of resistors in one pair of opposing arms of the bridge is different from the sensitivity of another pair of resistors in opposing arms. The different sensitivities may be obtained by exposing only a portion of the resistors constituting opposing arms to the gases. Thus, the resistor in a test cell containing a gas to be tested may be connected in series or in shunt to another resistor that is not exposed to the particular gas that is in the test cell.

Another way is to provide a bridge circuit in which the effect on a temperature-sensitive resistor of a gas under test is reduced. This may be accomplished in either of two ways. One way is to dilute the gas under test with an inert gas before delivering it to the test cell or cells in certain arms of the bridge.

Another way is to provide a diffusion passage between two cells in opposing arms of the bridge, so that there is a limited interchange of gas by diffusion between the two cells and hence, a partial reduction of the differential between the thermal-conductivities of the two gases.

The present invention includes various features which increase the general usefulness of bridge circuits.

One feature is the provision of a reversing switch for reversing the positions in the bridge of two opposing arms. In one position of the reversing switch, the effects of one pair of opposing arms is additive with respect to the other pair of opposing arms, while with the switch in its other position the effect on the bridge circuit of one pair of opposing arms is subtractive with respect to the other pair of arms. This arrangement may be used to add the effects produced by four gases, irrespective of whether the signs of the thermal-conductivities of the gases applied to the respective pairs of cells are the same or opposite.

Another feature of the invention is a single bridge circuit that can be readily converted into two separate bridge circuits for comparison of gas-sensitive resistors against auxiliary resistors that are not affected by the gas, with current dividing resistors for balancing the separate bridge circuits.

Another feature of the invention is a bridge circuit having auxiliary resistors which can be used in combination with temperature-sensitive resistors for providing either two separate bridge circuits or a single bridge circuit, with provision for cutting out the auxiliary resistors to thereby increase the sensitivity of the bridge and automatically cut in additional series resistance to maintain the current constant in the bridge.

Still another feature of the invention is a single bridge circuit in combination with switching facilities for readily forming two different bridge circuits in place of a single bridge circuit and measuring two different gas components with the use of the same galvanometer.

Various other more specific objects and features of the invention will become apparent from the detailed description to follow with reference to the drawing, in which:

Fig. 1 is a schematic diagram of a system in accordance with the invention;

Fig. 2 is a simplified schematic diagram illustrating one condition of the electric circuit of Fig. 1 and an alternative gas ciriuit;

Fig. 3 is a simplified schematic diagram showing the electric circuit of Fig. 1 in still another condition of adjustment and showing still another gas circuit.

Figure 4:
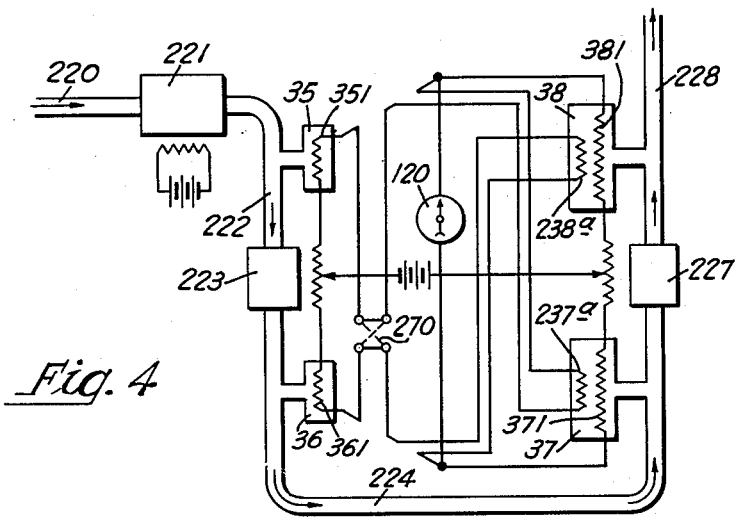
Fig. 4 is a schematic diagram showing a system alternative to that of Fig. 3.

In Fig. 1, four temperature-responsive, electrically heated resistors 351, 361, 371 and 381 are positioned in four test cells 35, 36, 37 and 38, respectively. Such test cells may, for example, be of the type which is disclosed and claimed in my Patent No. 2,506,535 which issued May 2, 1950.

The resistors 351 and 361 are in opposing arms of one bridge circuit, X, and the resistors 371 and 381 are in opposing arms of a second bridge circuit, Y. The resistors 351 and 361 are interconnected by a tapped resistor 101 having an adjustable tap 102, which is connected through a resistor 103, a variable resistor 104, and a milliammeter 150 to one terminal of a current source 105. The other terminal of the source is connected through a switch 106 to a tap 108 on a resistor 109, which interconnects the resistors 371 and 381.

The other two arms of the bridge X are constituted by fixed resistors 110 and 111, and the other two arms of bridge Y are constituted by a pair of fixed resistors 112 and 113. Furthermore, one end of resistor 110 is directly connected by a conductor 114 to one end of the resistor 112, and the resistor 111 is directly connected by a conductor 115 to the resistor 113. Various points on the bridges X and Y are connected to contacts of a multiple position switch 116, so that by shifting the switch into different ones of five positions, different circuits can be obtained. The five positions of the switch 116 are identified by the letters A, B, C, D and E, respectively.

Position A is an inactive position, in which contacts 117 of the switch, which are connected to a pair of conductors 118, are disconnected from both the bridges X and Y. It will be observed that the conductors 118 are adapted to be connected by a reversing switch 119 to a meter 120. During a test, the switch 116 is adjusted into position B, C, D or E.

When the switch 116 is moved into position B, the resultant bridge circuit includes the resistors 351, 361, 110 and 111 in the four arms of the bridge, with the meter 120 connected between the junction 121 of the resistors 361 and 110 and the junction 122 of the resistors 351 and 111. Thus, when the switch 116 is in position B, the contacts 117 are connected directly to contacts 123 and 124, which are connected to the junctions 122 and 121, respectively, and the conductors 114 and 115 are short-circuited at the switch contacts 125 and 126. It will be observed that the connection from the short-circuited conductors 114 and 115 to the tap 108 is completed through the bridge Y, but this does not affect the balance of the bridge X.

In position C, all the conditions are the same as in position B, except that the meter 120 is connected across the junctions 127 and 128 by switch contacts 129 and 130, respectively, and the connections to the meter are reversed as compared to the connections in position B.

When switch 116 is moved into position D, the bridge circuit contains both the resistors 361 and 110 in one arm of the bridge, the resistors 351 and 111 in the adjacent arm of the bridge, the resistors 112 and 381 in the third arm of the bridge, and the resistors 113 and 371 in the fourth arm. It will be noted that in position D the switch 116 no longer short-circuits the conductors 114 and 115 through contacts 125 and 126, but, instead connects these conductors through contacts 131 and 132 to the meter 120.

In position E of switch 116, the bridge circuit includes only the cell resistors 351, 361, 371 and 381 in the respective arms of the bridge, and the meter 120 is reversed with respect to its connection in position D. Thus, it will be observed that the meter contacts 117 are connected to contacts 133 and 134, which are connected to the junctions 127 and 122, respectively; contact 135 short-circuits a pair of contacts 136 and 137 connected to the junction 122 of bridge X and the junction 128 of bridge Y, respectively; and another contact 138 short-circuits a pair of contacts 139 and 140, which are connected respectively to the junction 127 of bridge Y and the junction 121 of bridge X.

It will be observed that in positions A, B, C and D the switch contact 138 interconnects a pair of arcuate contacts 141 and 142, which are connected to opposite ends of the resistor 103. This functions to automatically remove the resistor 103 from the circuit and thereby increase the potential applied between the taps 102 and 108 when all eight of the bridge resistors are in the circuit. However, in position E the fixed resistors 110, 111, 112 and 113 are removed from the circuit, and it is to compensate for the resultant reduction in the total resistance of the bridge that the resistor 103 is introduced.

The above bridge circuit is particularly useful in combination with a particular type of gas analysis apparatus for which my separate patent application, Serial No. 676,820 was filed simultaneously herewith, on June 14, 1946. Said application shows a convenient way of supplying two pairs of cells with three or more different gases, and it may be assumed, in a joint reading of said two applications, that the four temperature-sensitive resistors shown in said apparatus correspond to the four temperature-sensitive resistors of the circuits shown herein.

It is sometimes desirable to successively manipulate the switch 116 to produce the four different connections corresponding to positions B, C, D and E during successive steps in a single analysis. As an example, the bridge circuit of the present invention is particularly well suited for the practice of the method described in my copending application, Serial No. 564,645, filed November 22, 1944 with reference to Fig. 1 of the drawing in that application. The above-mentioned application discloses a method of determining, by thermal-conductivity measurements on exhaust gas, the oxygen equivalent of both the water and the carbon dioxide in the exhaust gas. In practicing the method with the present bridge apparatus, cells 35, 36, 37 and 38 of the present application would be substituted for cells 10a, 12a, 13a and 11a, respectively, of the prior application.

Under the conditions outlined, cell 35 would contain normal exhaust gas containing both water vapor and carbon dioxide; cells 36 and 37 would contain exhaust gas from which the water had been removed but in which the carbon dioxide was still present; and cell 38 would contain exhaust gas from which both the water and carbon dioxide had been removed.

By moving the switch 116 into position B, the resistor 351, exposed to normal exhaust gas, would be compared against resistor 361, which is exposed to dry exhaust gas, thereby enabling the determination of the water content of the gas.

By moving the switch 116 into position C, the resistor 371, exposed to dry exhaust gas, would be compared against the resistor 381, which is exposed to exhaust gas from which both the water and carbon dioxide have been removed, thereby enabling the determination of the carbon dioxide content of the exhaust gas.

By moving the switch 116 into position D, the resistor 351, exposed to normal exhaust gas, and the resistor 381, exposed to exhaust gas from which both the water and carbon dioxide had been removed, would be connected in opposite arms of the bridge so that they would produce a cumulative effect. The resistor 361 and the resistor 371, both of which are exposed to dry exhaust gas, would be connected in the other two arms of the bridge and produce a cumulative effect. The net effect of the resistors 351, 361, 371 and 381 would be to produce a reading of the meter 120 indicative of the oxygen equivalent of the sum of the water and the carbon dioxide in the exhaust, as fully explained in said application, Serial No. 564,465.

It will be observed that a reversing switch 270 is provided in the bridge circuit Y between the fixed resistors 112, 113 and the temperature-sensitive resistors 371 and 381. By means of this reversing switch, the two pairs of opposing temperature-sensitive resistors 351, 361 and 371, 381, respectively, may be connected so as to add the changes of potential produced by each individual pair, or they may be connected so as to subtract the potential produced by one pair from the potential produced by the other pair. In the first case, these two pairs of resistors serve to add the effects produced by four gases if the effects of each pair of gases are of the same sign (that is, both plus or both minus). On the other hand, if the effects of the two pairs of gases are opposite, then in order to produce the summation of the effects the relative position of said two pairs of resistors is reversed by means of the switch 270.

The separately adjustable current-dividing resistors 101 and 109 at opposite ends of the single bridge circuit are particularly useful in that when the single bridge circuit is divided into two bridge circuits, any unbalance between each pair of opposing temperature, sensitive resistors can be separately balanced or neutralized. Thereafter, when the switch 116 is shifted to combine the two bridge circuits into a single bridge circuit, one may be assured that the single bridge circuit is balanced not only at the neutral points but is also balanced on each side. The provision of the two current-dividing resistors insures that only potentials produced by the effects of the thermal-conductivity of the gas on the temperature, sensitive resistors will be added or subtracted, according to the position of the reversing switch.

The above-described elements of my bridge circuit are further useful because they permit, merely by operation of the reversing switch 270, the obtaining of either the sum of or the difference between the two unknown potentials produced by each pair of temperature-sensitive resistors.

Thus, assigning to said two unknown values of potential the symbols of $x$ and $y$, respectively, and assigning the symbols $a$ and $b$ to the values of the readings obtained in said two positions of switch 270, there results a set of two linear equations with two unknowns:

$$x+y=a$$
$$x-y=b$$

Consequently, in a well known manner, the value of $x$ and $y$ can be obtained from said two equations. In other words, the above circuit elements permit not only the obtaining of the integrated effect of two unknown individual effects, but, as well, permit the evaluation of each of said individual effects.

As has been already explained, the two pairs of auxiliary resistors 110, 111 and 112, 113, respectively, are useful for the check of balance between the two temperature-sensitive resistors forming each pair. However, after this task is performed, it is often undesirable to have them in the bridge circuit. For example, they increase the total resistance of the bridge and decrease its sensitivity. In my circuit, provisions are made to short-circuit said auxiliary resistors after they serve their useful purposes by moving the switch 116 into position E. It will be apparent that each pair of opposing auxiliary resistors 110, 111 and 112, 113 should be carefully balanced individually, and the sum resistance of resistors 110 and 112 should be equal to the resistance of resistor 103.

The combination of the reversing switch 270 with the dividing resistors 101 and 109 permits individual balancing of each pair of opposing arms when switch 116 is in position E and the auxiliary resistors are short-circuited, as follows: In either position of switch 270, the bridge is first balanced by adjusting either tap 102 or 108. Thereafter, the switch 270 is reversed, the deflection of the galvanometer, if any, is recorded, and half the value of the deflection is neutralized by adjusting tap 102, and the other half is neutralized by adjusting the tap 108.

In Fig. 1 the bridge circuit described is employed with a gas circuit for testing the exhaust gas resulting from combustion of a hydrocarbon fuel with air in accordance with a general scheme disclosed in my copending patent application, Serial No. 672,472 filed May 27, 1946.

Thus, there is shown schematically a combustion device 151 having a fuel-air ratio adjusting handle 152 movable over a graduated scale 153, whereby the fuel-air mixture can be made rich or lean to equal extent. Exhaust from the combustion device 151 flows through a conduit 154 and a portion of the exhaust is diverted into a branch conduit 155. Inserted in the conduit 155 is a gas conditioner 156 which may be of such construction as to remove everything from the exhaust gas except oxygen and combustible gases.

After leaving the conditioner 156, the gas passes through a restricter 157 and into two branch conduits 158 and 159, respectively. The branch conduit 158 is connected in turn to two branch conduits 163 and 164 through which it flows into a common duct 173.

The branch conduit 163 is connected to the gas cell 35 and the branch conduit 164 is connected to the gas cell 36. A treating chamber 165, which may contain copper oxide is positioned in the conduit 163 ahead of the cell 35, and it may be heated by any suitable means, which, in this instance, is an electrical resistance element 166 energized by current from a battery 167.

The branch conduit 159 feeds into two branch conduits 168 and 169, respectively, to which the test cells 37 and 38 are respectively connected. Both the conduits 168 and 169 feed into the duct 173. A treating chamber 170 is positioned in the conduit 169 ahead of the cell 38 and may contain carbon and be heated by a resistor 171 energized by current from a battery 172.

It will be observed that a conduit 160 is connected to the branch conduit 158 and is adapted to supply air thereto through an adjustable restrictor 162 and a valve 161. The special purpose of elements 160, 161 and 162 will be described later and in the meantime it may be assumed that the valve 161 is closed.

There is also shown a passage 273 interconnecting the cells 35 and 36 and containing a valve 174. The purpose of this valved passage will be described later and for present purposes it may be considered that the valve is closed to segregate the cells 35 and 36 each from the other.

Assuming that the treating chamber 165 contains hot copper oxide, rich exhaust gas (containing unburned combustible) will be altered in passing therethrough, so that for a rich mixture the gas in cell 35 will differ from that in cell 36. On the other hand, when the mixture is lean, the exhaust gas will contain no unburned combustible that would be affected by hot copper oxide, so that the gas in cells 35 and 36 will have the same composition.

In contrast, hot carbon in the treating chamber 170 will be consumed by the oxygen in a lean mixture, so that the gas in cell 38 will differ from the gas in cell 37. On the other hand, when the mixture is rich, the exhaust will be unaffected by hot carbon in the chamber 170 and the cells 37 and 38 will contain gas of the same composition.

It will be apparent, therefore, that when the exhaust is lean only the temperature-sensitive resistors 371 and 381 will develop a potential, whereas when the exhaust is rich, only the temperature-sensitive resistors 351 and 361 will develop a potential. When the mixture is theoretical, neither pair of temperature-sensitive resistors will produce a potential. Therefore, strictly speaking, the integration by the bridge circuit of the effects produced by both pairs of temperature-sensitive resistors does not occur simultaneously but it does occur consecutively as the mixture changes from rich to lean or vice versa.

Some features of this system are disclosed and claimed in my copending patent application Serial No. 477,675 filed March 1, 1943.

The bridge circuit described resembles that of application, Serial No. 672,472 in that exhaust gas treated with hot copper oxide is compared with exhaust gas treated with hot carbon. However, the present system differs from that of the last-mentioned application in that it depends on the simultaneous use of three or more different gases in four different test cells, the four temperature-sensitive resistors of which are included in a single bridge circuit.

The present system has the advantage over the system of application Serial No. 672,472 in that it does not require a meter of biased sensitivity in order to give equal deflections for rich and lean mixtures.

In accordance with the present invention, the need for a biased sensitivity meter can be eliminated by the provision of suitable shunts connected across the temperature-sensitive resistors 351 and 361 and these shunts will be described next.

As has been pointed out in detail in my copending application, Serial No. 672,472, ordinarily the sensitivity of a thermal-conductivity cell to the exhaust of a rich mixture is much greater than its sensitivity to the exhaust of a lean mixture, because a rich mixture usually contains hydrogen which has a very high thermal-conductivity, whereas no hydrogen is present in the exhaust of a lean mixture.

In the circuit shown in Fig. 1, equalization of response to rich and lean mixtures can be obtained by shunting the temperature-sensitive resistors 351 and 361 with resistors that are not exposed to the gases in the cells 35 and 36. It is essential that both the temperature-sensitive resistors 351 and 361 be shunted by resistors of the same value, and to make the apparatus flexible for use in making tests on various gases, the shunt resistors should be continuously variable in equal degree.

To obtain this result, I show in Fig. 1 separate shunts for the resistors 351 and 361 which are adjustable and mechanically coupled together so that the sensitivities of the resistors 351 and 361 may be reduced in equal degree in a plurality of settings.

Thus, there are provided for connection in shunt to the temperature-sensitive resistor 351, a resistor 175 and a resistor 176. The value of the resistor 175 is fixed, but the amount of the resistor 176 that is included in the circuit can be varied by means of a slide 177. A switch 178 is provided to open the shunt circuit when the sensitivity of the resistor 351 is not to be reduced. The temperature-sensitive resistor 361 is likewise adapted to be shunted by a pair of resistors 180 and 181, the latter having an adjusting slide 182 for adjusting its value. A switch 183 is provided for connecting the resistors 180 and 181 in and out of circuit.

It will be observed that both of the slides 177 and 182 are mechanically supported on a common framework 184 for movement simultaneously to equal extent. Furthermore, the extent to which the resistors 176 and 181 are included is indicated by a pointer 185 movable over a scale 186.

Shunting of the temperature-sensitive resistors 351 and 361 by the resistors 175 and 176 and the resistors 180 and 181, respectively, may produce an appreciable change in the total resistance of the bridge circuit, and to maintain the total resistance constant and also maintain the resistance of each arm of the bridge constant, I may provide an auxiliary resistor 187 which can be adjustably included in series with the temperature-sensitive resistor 361 and an auxiliary resistor 188 which can be adjustably included in series with the temperature-sensitive resistor 35. Thus, one end of the resistor 187 is connected permanently to one end of the resistor 361, but is connected to one end of the current-dividing resistor 101, by a slide 189. The resistor 188 likewise is permanently connected at one end to one end of the temperature-sensitive resistor 351 but is adapted to be connected through a slide 190 to the other end of the current-dividing resistor 101. The slides 189 and 190 are mounted on the same frame 184 that supports the slides 182 and 177, so that all four slides are constrained to move in unison.

It is necessary that the rate of change of the resistors 187 and 188 be different from the rate of change of the resistors 181 and 176 for a given movement of the frame 184, because the shunting of the temperature-sensitive resistors changes the sensitivity in non-linear proportion to the change in the value of the shunt-resistance, whereas the compensating resistors 187 and 188 produce changes in the resistances of the bridge arms in proportion to the displacement of the slides 189 and 190. To reduce these errors, the resistors 176 and 181 may be tapered from one end to the other as indicated schematically in the drawing.

As indicated by the scale 186 in Fig. 1, when the frame 184 is in extreme right position, the sensitivity of the temperature-sensitive resistors 351 and 361 is decreased to one-sixth of their normal value (their value when they are not shunted). On the other hand, when the pointer 185 is juxtaposed to the ½ mark on the scale 186, the resistors 181 and 176 are fully included in the circuit. The compensating resistors 187 and 188 are so arranged that when the pointer 185 is juxtaposed to the ½ mark on scale 186 to reduce the sensitivity of the resistors 351 and 361 to ½, the compensating resistors 187 and 188 are cut into the circuit to a sufficient extent to compensate for the reduction in the resistance of the bridge arms produced by the introduction of the shunt resistors 180, 181 and 175 and 176— the introduction of these resistors being achieved by closure of the switches 183 and 178.

The values of the portions of resistors 187, 188, 181 and 176 that should be cut into the circuit in the different positions of the frame 184 can be determined either by calculation or by experiment.

The values can be calculated by assuming that the sensitivity of the resistors 351 and 361 changes in proportion to the third power of the current (which may be assumed for certain cases). Assuming further that the temperature-sensitive resistors 351 and 361 have an average resistance of 10 ohms at average operating temperature and the normal value of the current in each temperature-sensitive resistance is 100 milliamperes, the values of the resistors may have the values shown in the following table:

*Table of conjugated values of shunt and compensating resistances (in ohms)*

| Reduction of sensitivity | ⅙ | ⅕ | ¼ | ⅓ | ½ | 1 |
|---|---|---|---|---|---|---|
| Variable shunts, 176 and 181 | 0.00 | 1.63 | 4.18 | 9.32 | 24.57 | 0 |
| Fixed shunts, 175 and 180 | 9.83 | 9.83 | 9.83 | 9.83 | 9.83 | 0 |
| Total shunt resistance | 9.83 | 11.46 | 14.01 | 19.15 | 34.40 | 0 |
| Compensating resistors 187 and 188 | 5.58 | 5.24 | 4.78 | 4.11 | 2.88 | 0 |
| Current, m. a. in resistors 351 and 361 | 55 | 58.5 | 62.8 | 69.2 | 79.3 | 100 |
| Current through shunt, m. a. | 45 | 41.5 | 37.2 | 30.8 | 20.7 | 0 |
| Total current, m. a. | 100 | 100 | 100 | 100 | 100 | 100 |

It is to be understood that the foregoing table should be considered only as an approximate example of the resistance values. In actual practice, the proper values of the shunt and compensating resistors can be readily determined experimentally when the bridge is divided into two separate bridge circuits by movement of the switch 116 into positions B and C, respectively.

For example, a mixture of air and $CO_2$ can be flowed to the cells 35 and 36 while air alone is flowed to the pair of cells 37 and 38. Under these conditions, the deflections produced by the two pairs of cells are equal when the shunts are cut out by opening the switches 183 and 178, and the compensating resistors 187 and 188 are adjusted to zero value, as shown in Fig. 1.

Thereafter, the shunts are included into the circuit by closing the switches 183 and 178, and the frame 184 is adjusted to move the slides 182 and 177 into that position in which the deflection produced by the bridge X is one-half of its former value. Thereafter, the values of the portions of the compensating resistors 187 and 188 that are included in the circuit are so chosen that the current through the bridge is restored to its normal value (200 m. a. in the present instance). This operation can be repeated to determine the proper settings of the slides 182 and 177 to produce reductions of sensitivity of one-third, one-fourth, one-fifth and one-sixth, respectively, and to properly choose the values of the portion of resistors 187 and 188 that are included in the circuit in each position.

It is to be understood that it is not always necessary to make the shunt and compensating resistors adjustable. There are many situations where a fixed value of sensitivity is desired and may be obtained by choosing shunt and compensating resistors of proper value in the first place.

Further in accordance with the present invention, both a desired relative sensitivity of the arms of the bridge and continuous regeneration of the copper oxide in the treating chamber 165 can be obtained by diluting the exhaust gas in the branch conduit 158 with air admitted through the conduit 160. In general, the diluent gas should have a thermal conductivity substantially the same as that of the gas which is present as a diluent in the gas to be measured.

In the case of exhaust gas, nitrogen and oxygen may constitute the diluent gases, and their thermal conductivity is substantially the same as atmospheric air.

In practice, when employing dilution of the exhaust gas in conduit 158 to reduce the sensitivity and regenerate the copper oxide in the treating chamber 165, the valve 161 is opened and the restrictor 162 is adjusted until the desired dilution is obtained. It may be assumed that the duct 173 is connected to a suction pump to produce a sub-ambient pressure sufficient to draw air into the conduit 158 past the restrictor 162, or that air under super-ambient pressure is supplied to the inlet of the restrictor 162.

The proper adjustment of the restrictor 162 may be obtained as follows: First with valve 161 closed, the fuel-air ratio of the device 152 is altered by movement of the control handle 152 until the potential produced by each pair of temperature-sensitive resistors 351, 361, and 371, 381 is zero, as indicated by zero deflection of the meter 120, when the switch 116 is in position D or E. Then the handle 152 is moved an arbitrary distance in the direction to make the mixture lean, and the deflection of the meter 120 is recorded. Thereafter, the handle 152 is shifted the same arbitrary distance in the opposite direction from the position where the theoretical mixture was obtained, so as to make the mixture rich to the same extent that it was made lean by the previous movement. The deflection of the meter 120 generally will be several times larger for the rich mixture than it was for the lean mixture. The operator then opens the air valve 161 and adjusts the restrictor 162 until the deflection of the meter 120 is the same (but in the opposite direction) as it was for the previously recorded lean mixture. The system is thereby adjusted to indicate equivalent lean and rich mixtures by equal deflections on the meter 120.

It will be noted that the described procedure gives equal deflections for rich and lean mixtures on an ordinary unbiased meter because the sensitivity of the elements (resistors 351 and 361) producing an indication of the hydrogen concentration is reduced without changing the sensitivity of the elements (resistors 371 and 381) producing an indication of the oxygen concentration in a lean mixture.

The air admitted through conduit 160 into conduit 163 continuously regenerates any reduced copper in chamber 165 back to copper oxide.

In accordance with the invention, still another method of reducing the sensitivity of the cells 35 and 36 is to open the valve 174 in the diffusion passage 273 which interconnects the cells. This reduces the relative sensitivity of the cells 35 and 36 by automatic selective mixing of the gases within the two cells.

Thus, it is well-known that the thermal-conductivity of a gas is intrinsically dependent on the value of the diffusion constant for that gas, so that the diffusion constant is large when the thermal conductivity is high. It follows that where means is provided for transfer by diffusion of gas between the two cells, the reduction of the sensitivity of response is substantially proportional to the value of the thermal conductivity of the gas having the higher thermal conductivity.

When employing the diffusion passage 273 to reduce the sensitivity of response of the cells 35 and 36, calibration can be effected in exactly the same manner previously described in connection with the method of reducing sensitivity by dilution, except that whereas by the latter method the variable restrictor 162 is adjusted, in the present method the valve 174 is adjusted.

Fig. 2 illustrates the application of the invention to the analysis of exhaust gas resulting from combustion of pure carbon and air. The exhaust gas is first conducted by a conduit 200 past the cell 35 and then through a treating chamber 201 containing hot carbon. From the chamber 201 the gas flows through a conduit 202 past cells 36 and 37 to a treating chamber 206 containing hot copper oxide, from which it flows through a conduit 207 past cell 38. Air for dilution can be admitted into the conduit 202 through a conduit 204 containing a variable restriction 203 and a valve 205.

It is obvious, therefore, that cell 35 receives untreated exhaust, cells 36 and 37 receive exhaust that has been treated with hot carbon to consume any excess oxygen, and the cell 38 is exposed to exhaust gas that not only has been exposed to hot carbon to consume any excess oxygen, but has also been exposed to hot copper oxide to complete combustion of any carbon monoxide to carbon dioxide.

Obviously, the exhaust gas from a lean mixture will contain oxygen which, after treatment with heated carbon in the chamber 201, will be converted into carbon dioxide. Consequently, the potential produced by the resistors 351 and 361 in cells 35 and 36, respectively, will be proportional to the excess of oxygen.

On the other hand, when the mixture is theoretical or rich, the hot carbon in the chamber 201 will have no effect on the gas and no potential will be produced by the resistors 351 and 361.

Considering cells 37 and 38, the exhaust from a lean mixture will not be affected by contact with the hot copper oxide in the chamber 206, despite the fact that the exhaust has previously been treated with the hot carbon in chamber 201. Regardless of whether the mixture is theoretical or lean, all carbon will have been converted to carbon dioxide by the time it reaches the conduit 202, and hence, for lean and theoretical mixtures there will be no potential produced by the resistors 371 and 381 in cells 37 and 38, respectively.

However, since the exhaust from a rich mixture will contain carbon monoxide which will react with the hot copper oxide in the treating chamber 206 to produce additional carbon dioxide, there will be a potential developed by the resistors 371 and 381 of magnitude proportional to the amount of carbon dioxide additionally formed by treatment in the chamber 206.

If the resistors 351, 361, 371 and 381 are similar and equally sensitive, the deflection of the meter 120 produced by the additional carbon dioxide resulting from combustion of carbon monoxide in the chamber 206 by contact with the hot copper oxide therein will be twice as large for each per cent of deficiency in oxygen as the deflection produced by the potential developed in the resistors 351 and 361 from the burning of excess oxygen to carbon dioxide in the chamber 201.

This is so because half of the oxygen in the carbon dioxide produced by combustion of carbon monoxide with copper oxide in the chamber 206 was contributed by atmospheric air in the original combustion which burned the carbon to carbon monoxide; and only half of the oxygen in such carbon dioxide was contributed by the copper oxide in the chamber 206. On the other hand, all of the oxygen used to generate carbon dioxide in the treating chamber 201 is derived from the excess atmospheric air present in the original combustion.

In order to express on the same scale of the meter 120 the deficiency of oxygen in the exhaust of a rich mixture and the excess of oxygen in a lean mixture, it is necessary to reduce the potential produced by cells 37 and 38 to one half of the value of the potential produced by the cells 35 and 36.

In the system shown in Fig. 2, this can be accomplished by opening the valve 205, so that additional air will be mixed with the exhaust gas after it has passed cells 35 and 36. It is presumed that either suction is applied to the conduit 207 to reduce the pressure therein below the ambient pressure, or that the inlet end of the conduit 204 is connected to a source of air at super-ambient pressure in order to produce the necessary flow of air through the conduit 204 into the conduit 202.

In Fig. 2 the reversal switch 270 is normally in such position that the potential produced by the resistors 351 and 361 in response to carbon dioxide resulting from the combustion of carbon in the chamber 201 is of opposite sign to that produced by the resistors 371 and 381 by carbon dioxide resulting from combustion of carbon monoxide in the treating chamber 206. Consequently, the system disclosed in Fig. 2 indicates, by the direction of deflection of the meter 120, whether there is an excess or a deficiency of oxygen and indicates when the mixture is theoretically correct for complete combustion by giving a zero deflection.

It is an easy matter to adjust the restriction 203 to produce the desired dilution of the gas in the conduit 202. A procedure that may be followed is to deliver a constant rich exhaust mixture to the conduit 200 and observe the deflection of the meter 120 while the valve 205 is closed. Thereafter, the valve 205 is opened and the restriction 203 is adjusted until the deflection of the meter 120 is reduced to the desired value, which, in this instance, will be one half of its normal value when the valve 205 was closed.

In the arrangement of Fig. 2, as in the arrangement of Fig. 1, the dilution of the exhaust prior to its treatment with the hot copper oxide serves to regenerate any reduced copper therein.

When a rich mixture containing no free oxygen is admitted to a chamber containing hot copper oxide, a portion of the latter near the entry end of the chamber is usually first reduced to copper, and if rich exhaust is admitted to the chamber for a long time all of the copper oxide may be reduced to copper, whereupon the apparatus becomes inoperative.

However, by diluting the exhaust with an equal volume of air, the apparatus becomes for all practical purposes operative for an indefinite period of time, since the oxygen of the air regenerates any reduced copper back to copper oxide. An incidental advantage of employing continuous regeneration of the copper oxide is that it prevents deposit on reduced copper of carbon and gummy substances in the exhaust. Such deposits subsequently burn and upset the balance when the mixture later becomes lean.

It has been noted that in the system of Fig. 2 the reversing switch 270 should be positioned so that a lean mixture produces a potential which deflects the hand in the opposite direction from that in which it is deflected by a rich mixture. However, if the reversing switch 270 is in the opposite position, the theoretical mixture will still give a zero reading on the meter 120, but both lean and rich mixtures will deflect the needle away from zero in the same direction, although to equal extent.

It is also of interest to note that in Fig. 2 only one side of the circuit is abnormal at any given time. Thus, the potential produced by the resistors 351 and 361 in one pair of opposing arms of the bridge is affected by a lean mixture but not a rich mixture. On the other hand, the potential developed by the resistors 371 and 381 in the other pair of arms of the bridge is affected by a rich mixture but not by a lean mixture.

Fig. 3 illustrates the application of the invention to the analysis of exhaust gas from combustion of carbon containing sulphur. The exhaust gas may be delivered by the conduit 220 through a treating chamber 221 which may contain agents for completing combustion of combustible gases and removing water. From the chamber 221 the gas is conducted by a conduit 222 past the cell 35 and to a treating chamber 223, which contains an agent, such as lead peroxide, that is capable of removing sulphur dioxide from the exhaust gas. After being treated in the chamber 223, the exhaust gas is delivered to a conduit 224 which conducts it past the test cells 36 and 37 to a treating chamber 227 containing an agent capable of absorbing carbon dioxide, such as potassium hydroxide. From the treating chamber 227, the gas is delivered to a conduit 228 which conducts it past the test cell 38. After the gas has passed chamber 227 both the variable components (sulphur dioxide and carbon dioxide) have been eliminated. Therefore, if desired, the chamber 227 can be dispensed with and a fixed reference gas such as air can be sealed in the test cell 38.

The system shown in Fig. 3 is particularly useful for analyzing the products of combustion of fuels such as coal, which frequently contains sulphur, so that the exhaust of the fuel contains sulphur dioxide in addition to carbon dioxide. The effect on thermal conductivity of one per cent of sulphur dioxide is in the same direction and nearly three times as great as the effect of one per cent of carbon dioxide. Accordingly, considerable errors occur in analyzing the exhaust of coals containing sulphur by ordinary thermal conductivity methods, particularly if the percentage of sulphur in the coal varies.

In the past, it has been common practice to remove sulphur dioxide from exhaust gas prior to admission of the gas to the cells of a thermal conductivity gas analyzer. Obviously, when this is done, the apparatus does not take into account the amount of oxygen consumed in combustion of the sulphur in the fuel.

The system shown in Fig. 3 enables the measurement of the oxygen consumed in combustion of both the sulphur and the carbon. Thus the resistors 351 and 361 in one pair of opposing arms of the bridge produce a potential proportional to the amount of sulphur dioxide in the exhaust, which potential tends to shift the hand of the meter 120 in one direction from its normal or zero position.

The resistors 371 and 381 produce a potential proportional to the amount of carbon dioxide present in the exhaust gas, and the reversing switch 270 is positioned as shown in full lines so that this potential deflects the hand of the meter 120 in the said one direction. Therefore, the total deflection of the meter hand is the summation effect of both the carbon dioxide and the sulphur dioxide in the exhaust gas. However, in order for the sulphur dioxide and the carbon dioxide to both produce effects on the meter 120 that are proportional to the amount of oxygen consumed in their production, the response of the meter to a given percentage of sulphur dioxide is reduced to approximately one third of its normal value. This is done in the circuit of Fig. 3 by provision of suitable fixed shunts 235 and 236 connected to the temperature-sensitive resistors 351 and 361, respectively, and fixed resistors 237 and 238 connected in series in the respective arms of the bridge. In other words, the shunts 235 and 236 and the series resistors 237 and 238 of Fig. 3 perform the same function as the adjustable shunt and series resistors of Fig. 1.

The situation described with reference to Fig. 3 is characteristic of a large class of situations in which the gas resulting from action with a first agent (lead peroxide in this particular instance) has a thermal conductivity intermediate between that of the original gas and that of the gas obtained after treatments with a second agent (potassium hydroxide in this particular instance).

The method and apparatus is not confined in its usefulness to the analysis of the exhaust gas from coal containing sulphur and it is not confined to the specific reagents indicated, but is applicable to all systems in which the thermal conductivity of the gas resulting from the first treatment is intermediate the thermal conductivity of the original mixture and the gas obtained after a second treatment. Obviously, the ratio between the sensitivities of the two opposing pairs of resistors should be so chosen as to reduce the effects to a common scale.

It should be noted particularly that the system of Fig. 3 is distinct from that disclosed in my application, Serial No. 564,645, in which arithmetical summation of the effects produced by water vapor and carbon dioxide is utilized in the analysis of exhaust gas resulting from burning of hydro-carbons.

The distinction is of a two-fold nature. In the first place, sulphur dioxide and carbon dioxide affect the thermal conductivity of exhaust gas in the same direction, whereas carbon dioxide and water vapor produce opposing effects on the thermal conductivity of exhaust gas. In the second place, the effects on thermal conductivity produced by carbon dioxide and water formed from the same amount of oxygen may be assumed to be equal in magnitude, whereas the sulphur dioxide formed from one volume of oxygen affects the thermal conductivity to about three times the extent that the carbon dioxide formed from the same amount of oxygen does.

It is to be noted that the system of Fig. 3 differs from that of Fig. 2 in the following respect: In Fig. 2, the left and right halves of the bridge become effective consecutively as the mixture varies from rich to lean or vice versa, but both halves of the bridge do not vary in value simultaneously. In contrast, both the left and right halves of the bridge in Fig. 3 may vary simultaneously.

As a result of this, the system of Fig. 3 can be employed to not only obtain the total amount of oxygen consumed or required for the consumption of both the carbon and the sulphur, but can be used to obtain the relative amounts of carbon and sulphur in the fuel. Thus, when the reversing switch 270 is in the solid line position as described, the amounts of oxygen required for the production of the carbon dioxide and the sulphur dioxide, respectively, are added, after reduction to a common scale by means of the shunts 236 and 237. However, by throwing the reversing switch 270 into its other (dotted line) position, the effect of the sulphur dioxide is subtracted from that of the carbon dioxide. This yields two equations, as previously described in connection with Fig. 1, from which the relative amounts of carbon and sulphur can be determined.

The present invention further distinguishes from that disclosed in my application, Serial No. 564,645, in that my present invention provides for the determination of the concentration of one component of a parent substance when its presence is manifested by two gaseous components, such that the ratio of their effects on the thermal conductivity of the gas is different from the ratio of the amounts of the parent substances required for the formation of said components.

In contrast, the prior application, Serial No. 564,645, is limited to the particular situation in which oxygen of the air burns hydrocarbons to water and carbon dioxide. By a fortunate circumstance, each volume of oxygen forms one volume of carbon dioxide and two volumes of water, but the two volumes of water produce the same absolute effect (disregarding sign) as one volume of carbon dioxide.

In most situations, such a simple relationship as that existing between the thermal conductivities of water and carbon dioxide produced by consumption of a given amount of oxygen does not exist, and the components of a gaseous mixture resulting from interaction of parent substances will usually affect thermal conductivity to extents not proportional to the amounts of the common parent substance required for their formation, as evidenced by the example of carbon dioxide and sulphur dioxide which has been discussed.

As another example, hydrogen and carbon interacting with an excess of oxygen will produce only carbon dioxide and water, but may produce water and free hydrogen when there is insufficient oxygen for complete combustion. In such a situation, the oxygen concentration in a lean exhaust will be proportional to the excess of oxygen in the mixture, but of itself will produce only a small effect on the thermal conductivity, which for many purposes is negligible because the thermal conductivities of oxygen and nitrogen are nearly the same.

However, in a rich exhaust the deficiency of oxygen may be indicated by free hydrogen, which produces a great effect on the thermal conductivity of the exhaust. Thus, the hydrogen component in the exhaust is indicative of a deficiency of oxygen, although it does not contain any oxygen.

The systems so far described with reference to Figs. 1, 2 and 3 permit adjustment to attain a desired relationship between the sensitivities of response to a pair of different components such as carbon dioxide and hydrogen, carbon dioxide and sulphur dioxide, etc., by suppressing the sensitivity to one of the components. In some instances the desired relation between the sensitivities may be known in advance, and there may be no need for change of the relationship afterward. In such instances, a suitable bridge circuit can be constructed entirely of temperature-sensitive resistors and thus the efficiency of the circuit can be improved. It will be apparent that in the systems so far described some efficiency is sacrificed because the bridge circuit includes, in addition to the temperature-sensitive resistors contained within the gas cells, other resistors which are not exposed to the gases under test.

Sensitivity can be increased by employing a system as shown in Fig. 4. Fig. 4 is generally similar to Fig. 3 except that the shunts 235 and 236 of Fig. 3 have been eliminated, and the series resistors 237 and 238 have been replaced by auxiliary temperature-sensitive resistors 237a and 238a in the cells 37 and 38 respectively.

It will be observed that with the reversing switch 270 in the solid line position, the resistor 237a is connected in the same arm of the bridge and in series with the resistor 351, but resistor 237a is exposed to gas from which only sulphur dioxide has been removed. Therefore, to the change of potential produced by sulphur dioxide in the cell 35 there is added the change of potential produced by carbon dioxide in the cell 37. Thus whereas the system of Fig. 3 properly proportions the relative effects on the bridge circuit of the carbon dioxide and the sulphur dioxide by reducing the potential produced by the sulphur dioxide, the system of Fig. 4 obtains the desired result without reduction of sensitivity, by increasing the change of potential produced by the carbon dioxide.

Similarly, whereas in Fig. 4 the change of potential produced by the reference gas in the resistor 238a is added to the potential produced by the carbon dioxide in the resistor 361, in Fig. 3 the sensitivity of the resistor 361 is reduced by the shunt 236.

The cell 38 in Figs. 3 and 4 will receive a gas having a thermal conductivity substantially identical to nitrogen. Therefore, the cell 38 can be filled with nitrogen and sealed, if desired, thereby eliminating the need of the treating chamber 227.

The values of the temperature-sensitive resistors in the system of Fig. 4 must be chosen according to the gases that are being measured. For example, where measurements are made of exhaust gas from fuel containing carbon and sulphur, the four resistors 351, 361, 238a and 237a may be equal to each other, and each of these resistors may have a sensitivity just half of the sensitivity of the resistors 381 and 371, whereby the change of potential produced by each per cent of carbon dioxide will become substantially equal to the change of potential produced by each per cent of sulphur dioxide.

It is to be noted that when the reversing switch 151 is moved to the dotted line position, the effect of the sulphur dioxide is subtracted from that of the carbon dioxide, enabling the determination of the relative amounts of carbon and sulphur, the same as in the system of Fig. 3.

Figure 5:
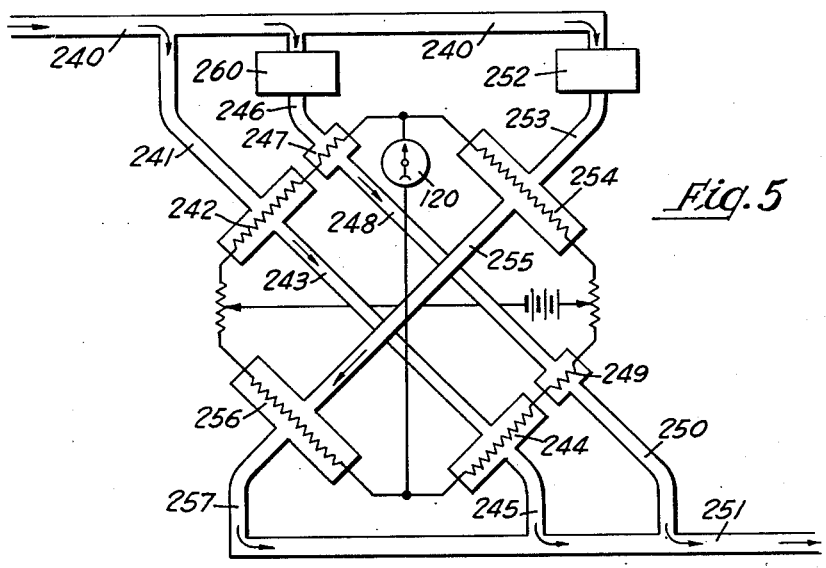
Fig. 5 is a schematic diagram showing a system alternative to that of Fig. 1.

Fig. 5 shows an alternative arrangement employing fixed resistors for producing equal deflections in response to exhaust gas from rich and lean mixtures, respectively. Thus, exhaust gas from a duct 240 may be broken up into three samples, one of which is untreated by either copper oxide or carbon and is delivered through a conduit 241 to a thermal conductivity cell 242 and thence through a duct 243 to a cell 244 which is in the opposite arm of the bridge from the cell 242. From the cell 244 the exhaust is delivered through a duct 245 to a common exhaust duct 251.

A second sample of gas from the exhaust line 240 is delivered through a chamber 260, in which it is treated with hot copper oxide, and through a duct 246, first to a thermal conductivity cell 247, and then through a duct 248 to a cell 249. From the cell 249 the gas is delivered through a duct 250 to the common exhaust duct 251.

A third sample of exhaust gas from the exhaust line 240 is delivered through a chamber 252, in which it is treated with hot carbon, and through a duct 253 to a cell 254 and thence through a duct 255 to a cell 256. From the cell 256, the exhaust is delivered through a duct 257 to the common exhaust line 251.

Since the cells 242 and 244 are in opposite arms of the bridge they are in aiding relation. Likewise, the cells 247 and 249 are in aiding relation to each other, and the cells 254 and 256 are in aiding relation to each other.

When the mixture is lean, the gases delivered to cells 247, 249, 242 and 244 are substantially identical, since a lean mixture will not be affected by hot copper oxide. However, of course the exhaust from a lean mixture will be affected by the hot carbon in the chamber 252, and the cells 254 and 256 will contain an added concentration of carbon dioxide proportional to the excess oxygen that was in the exhaust gas.

When the mixture is rich, it is unaffected by the treatment with the hot carbon in the chamber 252, and so the gas in the cells 254 and 256 is unaltered. Likewise, the gas in cells 242 and 244 is unaltered. However, the gas flowing through chamber 260 to cells 247 and 249 is acted upon by the hot copper oxide in chamber 260, and any hydrogen therein is burned to water so that the concentration of hydrogen or other combustibles in the cells 247 and 249 is nil.

Therefore, when the mixture is rich, only a portion of the resistance in the arms containing the cells 247 and 249 is affected, namely, that portion of the resistance which is constituted by the resistors in the cells 247 and 249. This reduces the sensitivity of the bridge to rich mixtures, and the sensitivity can be reduced to any desired extent by relatively proportioning the resistances of the resistors in the cells 247 and 249 with respect to the resistances of the resistors in the cells 242 and 244.

It will be noted, however, that when the mixture is lean, all of the resistance in the bridge arms containing the cells 254 and 256 is affected, so that the sensitivity to lean mixtures is relatively high. The resistors are preferably so proportioned that the total resistance in each arm is substantially the same as that in the other arms. In other words, the sum of the resistances of the resistors in cells 242 and 247 is approximately the same as the resistance of the resistor in cell 254. Furthermore, if the resistor in cell 247 has one third the sensitivity of the resistor in cell 242 the deflection of an ordinary meter 120 to a given deficiency of oxygen in a rich air fuel mixture will be substantially equal to the deflection of the same meter to a similar excess of oxygen in a lean air fuel mixture. This is because, as shown in the curves in Fig. 13 of my application Serial No. 477,675 filed March 1, 1943 the changes of thermal conductivity produced by equal deficiencies and excesses of oxygen in hydro-carbon fuel-air mixtures are unequal when the exhaust is treated with copper oxide and carbon as here described, the deflection being nearly four times as great for rich mixtures as lean mixtures.

For convenience of language in the claims, the expression "opposing resistors" has been used in referring to resistors in certain arms of the bridge circuits. In Figs. 1, 2 and 3, the resistors 351 and 361 are in one pair of opposing arms, and the resistors 371 and 381 are in another pair of opposing arms. The expression "opposing resistors" used in the claims, means any two resistors of the bridge in which similar resistance changes in the same direction tend to neutralize each other in their effect on the meter of the bridge circuit.

Although for the purpose of explaining the invention, certain specific embodiments thereof have been described in detail, it is to be understood that various changes and departures can be made from the particular constructions described without departing from the invention which is to be limited only to the extent set forth in the appended claims.

I claim:

1. In a gas analysis system of the type described: a bridge circuit having two pairs of opposing temperature-sensitive resistors in which the sensitivity of the resistors in one of said pairs is different from the sensitivity of the resistors in said other pair, and said bridge circuit includes a reversing switch for reversing the positions in said bridge of the two resistors constituting one of said pairs and means for exposing the resistors of each pair to a different sample of gas, said means including at least one duct for leading gas from a stream into exposing relationship with the resistors of one pair.

2. In a gas analysis system of the type described, a bridge circuit having a first pair of opposing temperature-sensitive resistors and a second pair of opposing temperature-sensitive resistors; first means for exposing the resistors of said first pair to samples of a gas for producing a temperature differential therebetween, and second means for exposing the resistors of said second pair of opposing temperature-sensitive resistors to samples of gas for producing a temperature differential therebetween, said bridge responding to a combination of said temperature differentials; and switch means for interchanging the positions in the bridge circuit of the two resistors constituting one of said pairs, while said temperature differential therebetween are maintained, whereby said bridge circuit is adapted to successively indicate the sum and difference respectively of said two temperature differentials.

3. A system as described in claim 2 including separate compensating resistance means connected with each of said pairs of resistors for separately neutralizing an unbalancing effect on said bridge of either of said pairs of resistors.

4. In a system of the type described, a bridge circuit having: a first pair of thermal-conductivity cells containing temperature-sensitive resistors in opposing relation in said bridge and means for supplying to said cells two gases distinguishing from each other by one component; a second pair of thermal-conductivity cells containing temperature-sensitive resistors connected in opposing relation in said bridge, and means for supplying to the respective cells of said second pair two gases distinguishing from each other by another measurable component, whereby the effects of said two measurable components are compared by the bridge; and means for controllably reducing the temperature differential between the resistors in one of said pairs of cells resulting from the change in thermal-conductivity caused by a change in the concentration of one of said measurable components, said last-mentioned means comprising means for diluting the gas supplied to one of said pairs of cells.

5. In a system of the type described, a bridge circuit having: a first pair of thermal-conductivity cells containing temperature-sensitive resistors in opposing relation in said bridge and means for supplying to said cells two gases distinguishing from each other by one component; a second pair of thermal-conductivity cells containing temperature-sensitive resistors connected in opposing relation in said bridge, and means for supplying to the respective cells of said second pair two gases distinguishing from each other by another measurable component, whereby the effects of said two measurable components are compared by the bridge; and means for controllably reducing the temperature differential between the resistors in one of said pairs of cells resulting from the change in thermal-conductivity caused by a change in the concentration of one of said measurable components, said last mentioned means comprising means defining a diffusion passage interconnecting one of said pairs of cells.

6. In thermal conductivity gas analysis apparatus: a bridge having first and second pairs of opposing arms containing electrically heated temperature-sensitive resistors disposed in test cells and means for supplying gases to be compared to said test cells; shunt variable resistance means connected in shunt to the temperature-sensitive resistors in one pair of opposing arms; series variable resistance means connected in series in said pair of opposing arms; and means for simultaneously varying said shunt and series resistance means in such relation as to maintain the total current in each arm substantially constant while varying the portion of the current in each arm that traverses the temperature-sensitive resistor therein.

7. A gas analysis system comprising: four thermal-conductivity cells arranged in first and second pairs, respectively, said first pair of cells having temperature-sensitive resistors connected, respectively, in a first pair of opposing arms of a bridge and the second pair of cells having temperature-sensitive resistors connected in a second pair of opposing arms of the bridge; a source of exhaust gas and a first conduit connected thereto; second and third conduits connected in parallel and to said first conduit; fourth and fifth conduits connected in parallel and to said second conduit for supplying gas to said first pair of cells, sixth and seventh conduits connected in parallel and to said third conduit for supplying gas to said second pair of cells; and means arranged in said fourth and sixth conduits for altering the composition of the gas prior to delivery of the gas thereby to the associated cells, whereby treated gas is compared with untreated gas in each pair of opposing arms of said bridge.

8. Gas analysis apparatus comprising: four test cells for receiving gas to be analyzed, each cell having an electrically heated test resistor, the resistance of which varies with temperature and the temperature of which varies according to the thermal conductivity of gas in the cell; four fixed comparison resistors; a current limiting resistor; a source of current; potential responsive means; switching means operable into four different positions and having a plurality of contacts so disposed and so connected to said resistors, source of current, and potential responsive means that bridge circuits are created, in which: in a first position of said switch, one pair of said test resistors are in one pair of adjacent bridge arms, and one pair of said comparison resistors are in the other pair of adjacent bridge arms; in a second position of said switch, the other pair of test resistors are in one pair of adjacent bridge arms, and the other pair of comparison resistors are in the other pair of adjacent bridge arms; in a third position of said switch, said one pair of test resistors and said one pair of comparison resistors are in one pair of adjacent bridge arms, and the other pair of test resistors and the other pair of comparison resistors are in the other pair of adjacent bridge arms; and in a fourth position of said switch, said one pair of test resistors constitute one pair of adjacent arms of said bridge and the other pair of test resistors constitute the other pair of adjacent arms of said bridge.

WLADIMIR M. ZAIKOWSKY.

REFERENCES CITED

The following references are of record in the file of this patent:

UNITED STATES PATENTS

| Number | Name | Date |
|---|---|---|
| 1,206,968 | Wilsey | Dec. 5, 1916 |
| 1,530,202 | Rodhe | Mar. 17, 1925 |
| 1,644,951 | Rodhe | Oct. 11, 1927 |
| 1,681,047 | Porter | Aug. 14, 1928 |
| 1,707,624 | Brown | Apr. 2, 1929 |
| 1,715,374 | Krueger | June 4, 1929 |
| 1,829,649 | Harrison | Oct. 27, 1931 |
| 1,981,172 | Harrison | Nov. 20, 1934 |
| 2,000,119 | Brown et al. | May 7, 1935 |
| 2,005,036 | Howe | June 18, 1935 |
| 2,042,646 | Willenborg | June 2, 1936 |
| 2,050,878 | Dallman et al. | Aug. 11, 1936 |
| 2,053,121 | Vayda | Sept. 1, 1936 |
| 2,135,587 | Lovelady | Nov. 8, 1938 |
| 2,175,890 | Glowatzki | Oct. 10, 1939 |
| 2,204,966 | Morgan et al. | June 18, 1940 |

FOREIGN PATENTS

| Number | Country | Date |
|---|---|---|
| 283,667 | Germany | Aug. 12, 1913 |
| 373,239 | Germany | Mar. 4, 1922 |
| 425,518 | Germany | July 1, 1924 |
| 494,754 | Great Britain | Oct. 31, 1938 |
| 883,420 | France | July 5, 1943 |

OTHER REFERENCES

Book—Gas Analysis by Measurement of Thermal Conductivity, by Daynes. Published—Cambridge University Press 1933.